May 8, 1934. J. L. BAIRD 1,957,815
TELEVISION APPARATUS
Filed Jan. 15, 1931 6 Sheets-Sheet 1
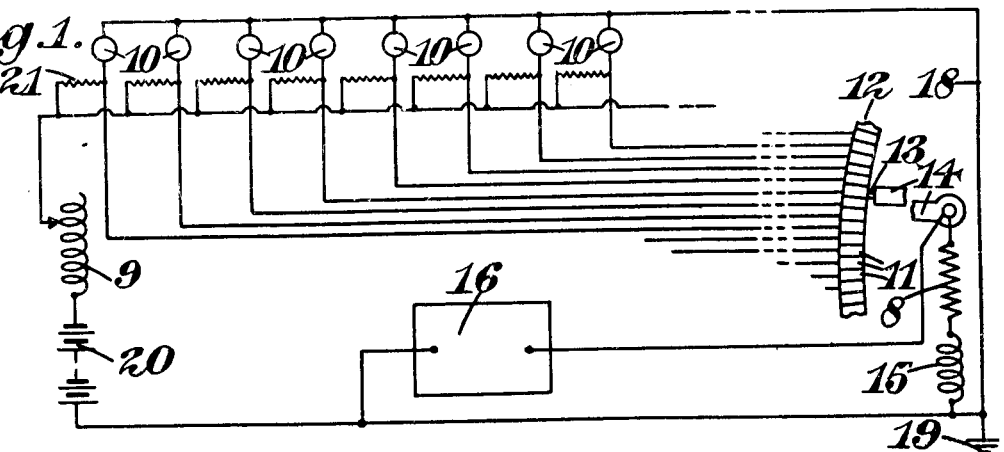
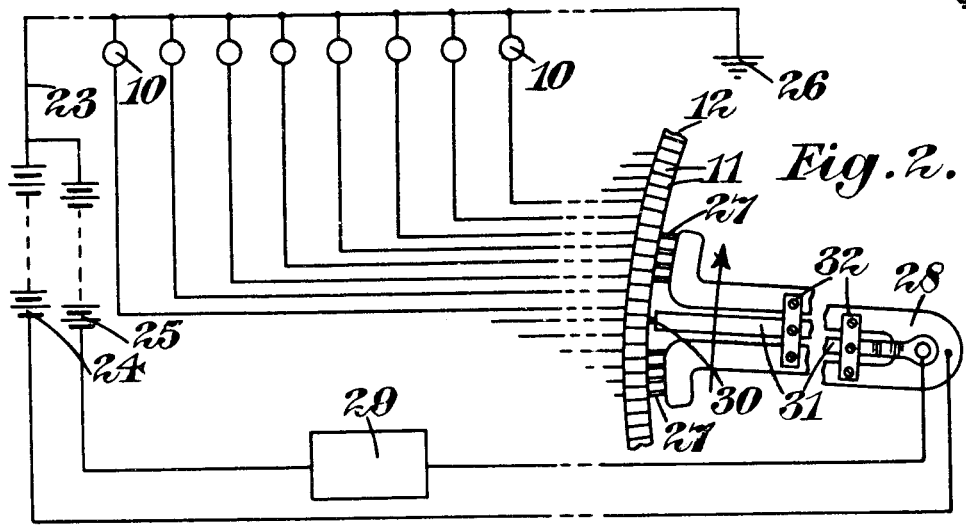
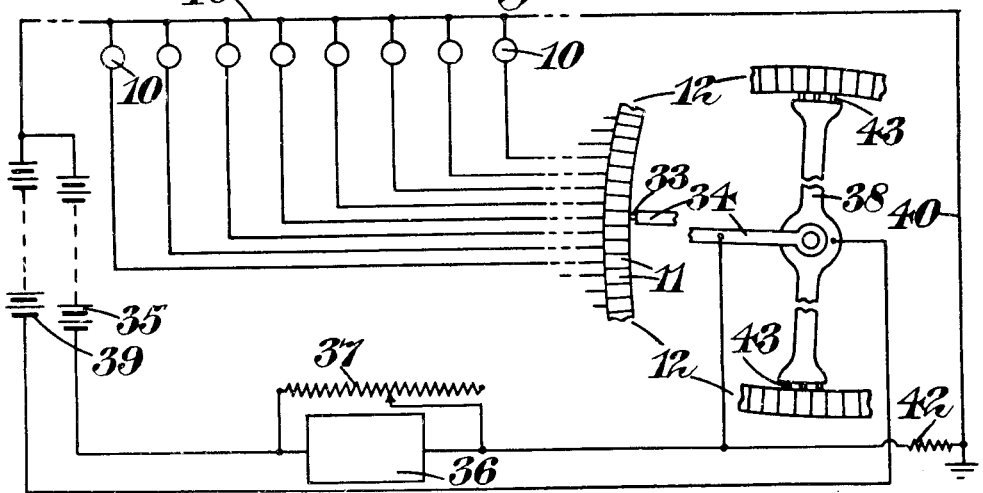

May 8, 1934.    J. L. BAIRD    1,957,815
TELEVISION APPARATUS
Filed Jan. 15, 1931    6 Sheets-Sheet 2

INVENTOR
John L. Baird,
By
Watson, Coit, Morse & Grindle
Attys

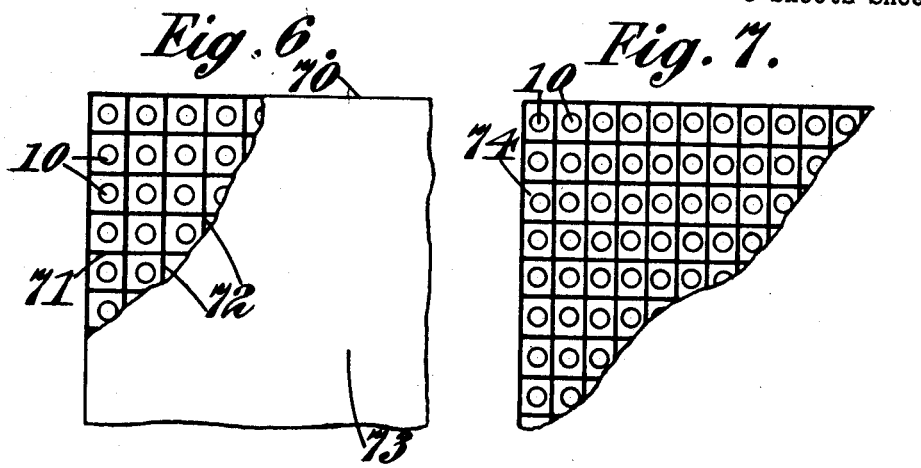
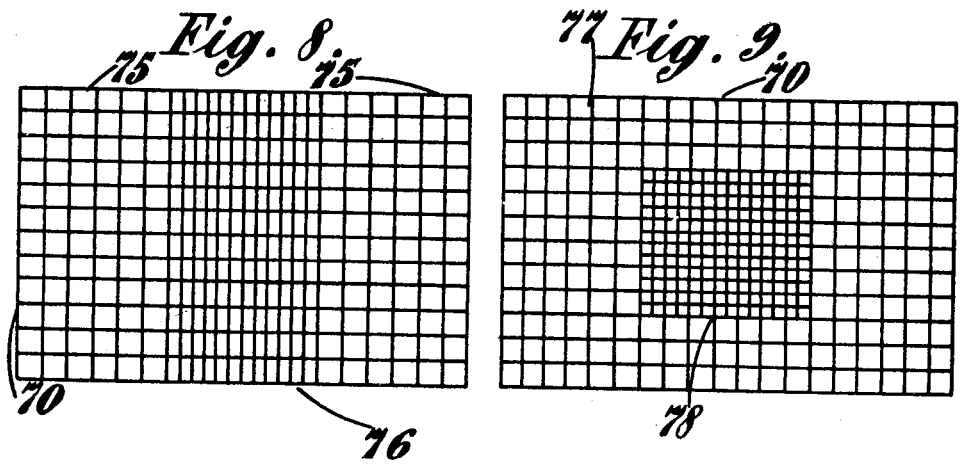
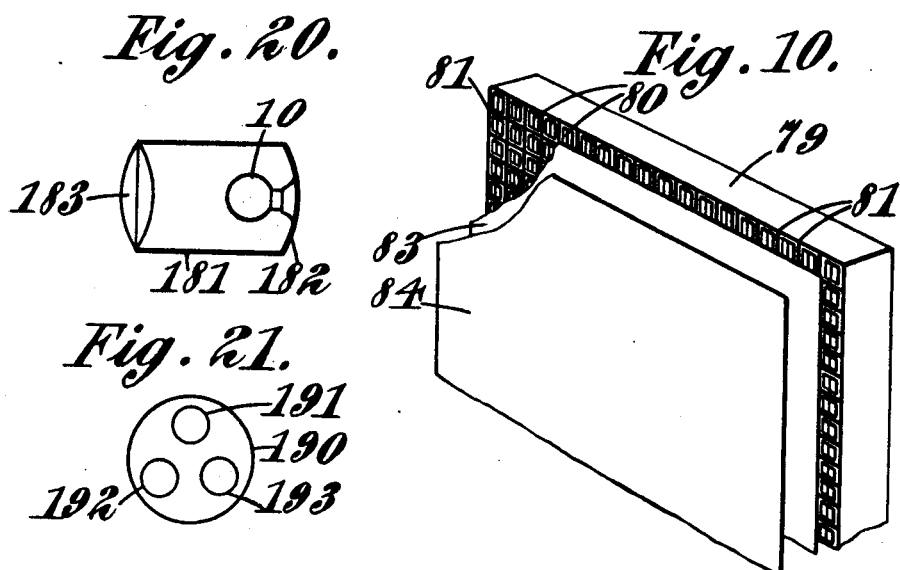

May 8, 1934.　　　　　J. L. BAIRD　　　　　1,957,815
TELEVISION APPARATUS
Filed Jan. 15, 1931　　　6 Sheets-Sheet 4
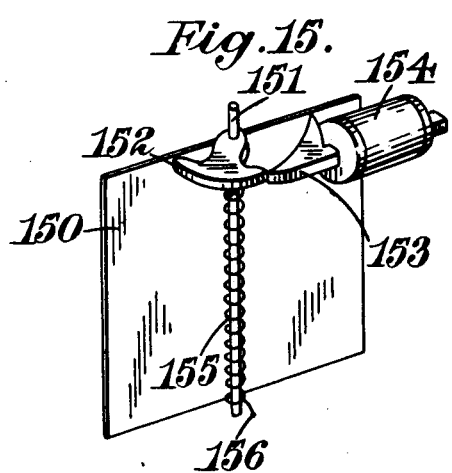
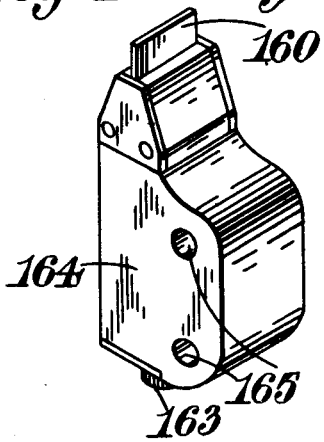
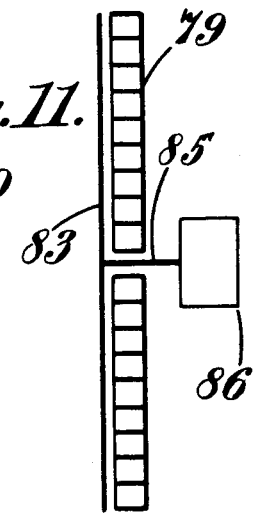
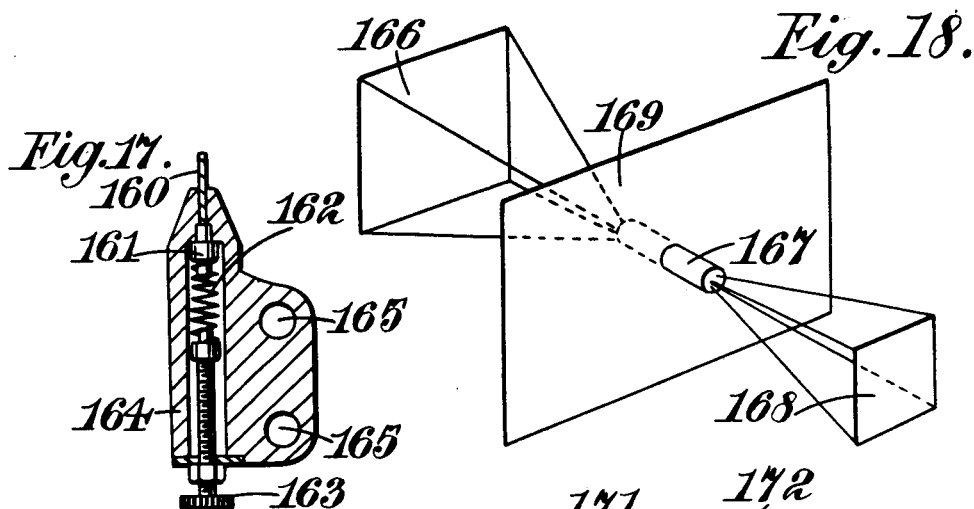
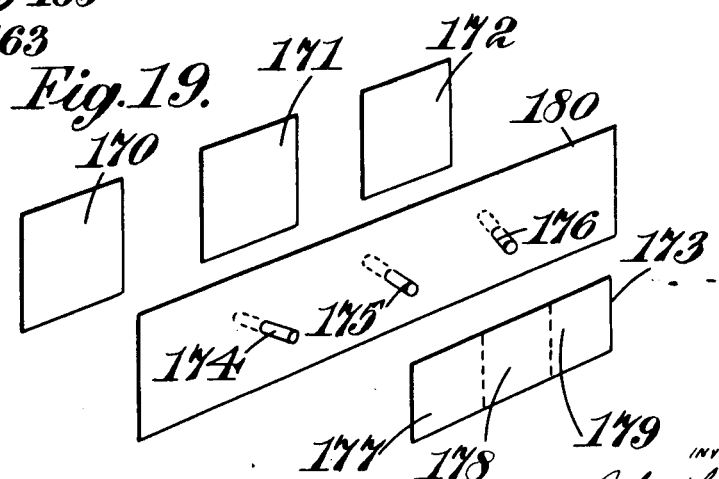

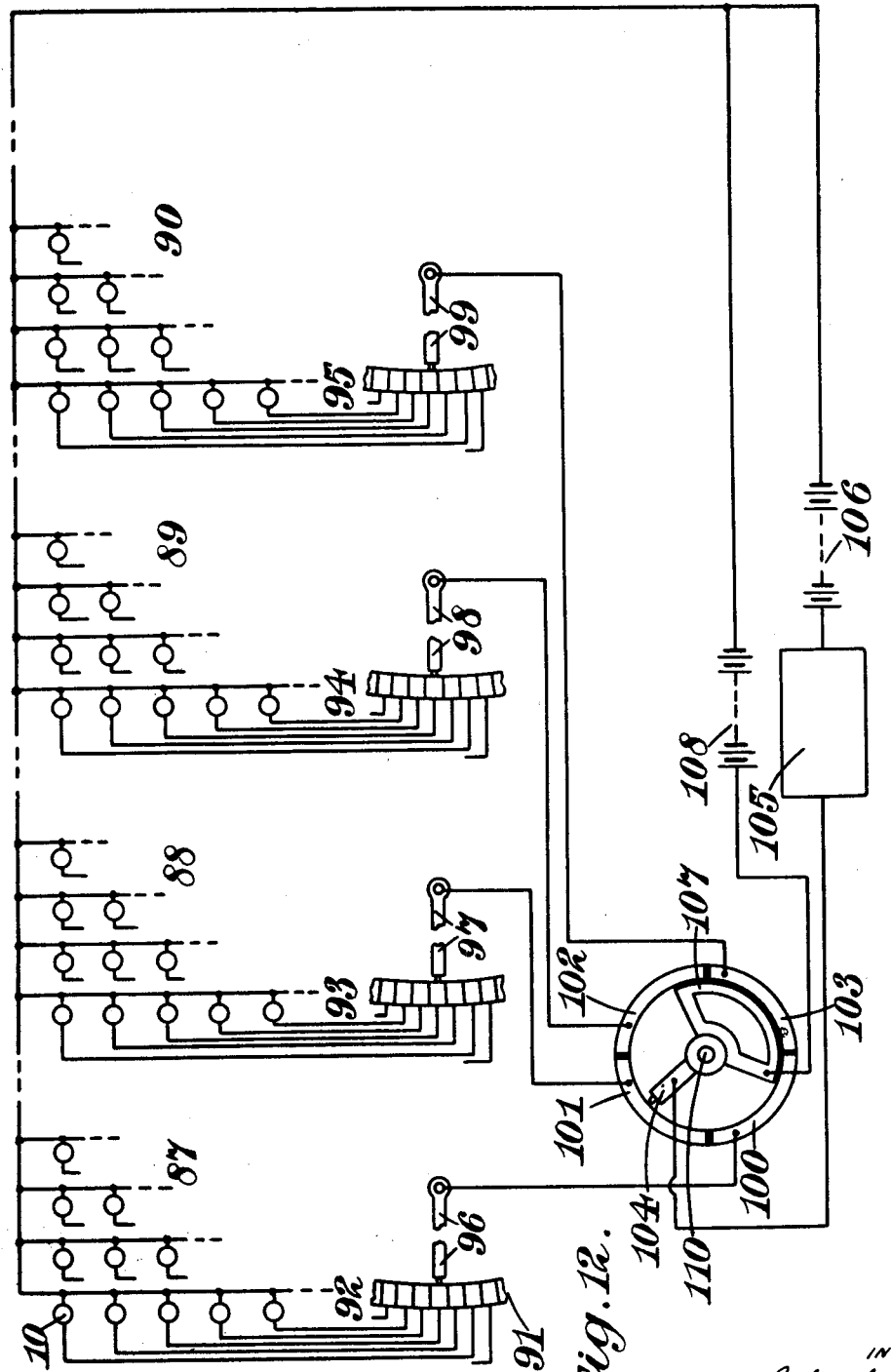

May 8, 1934.  J. L. BAIRD  1,957,815
TELEVISION APPARATUS
Filed Jan. 15, 1931   6 Sheets-Sheet 6
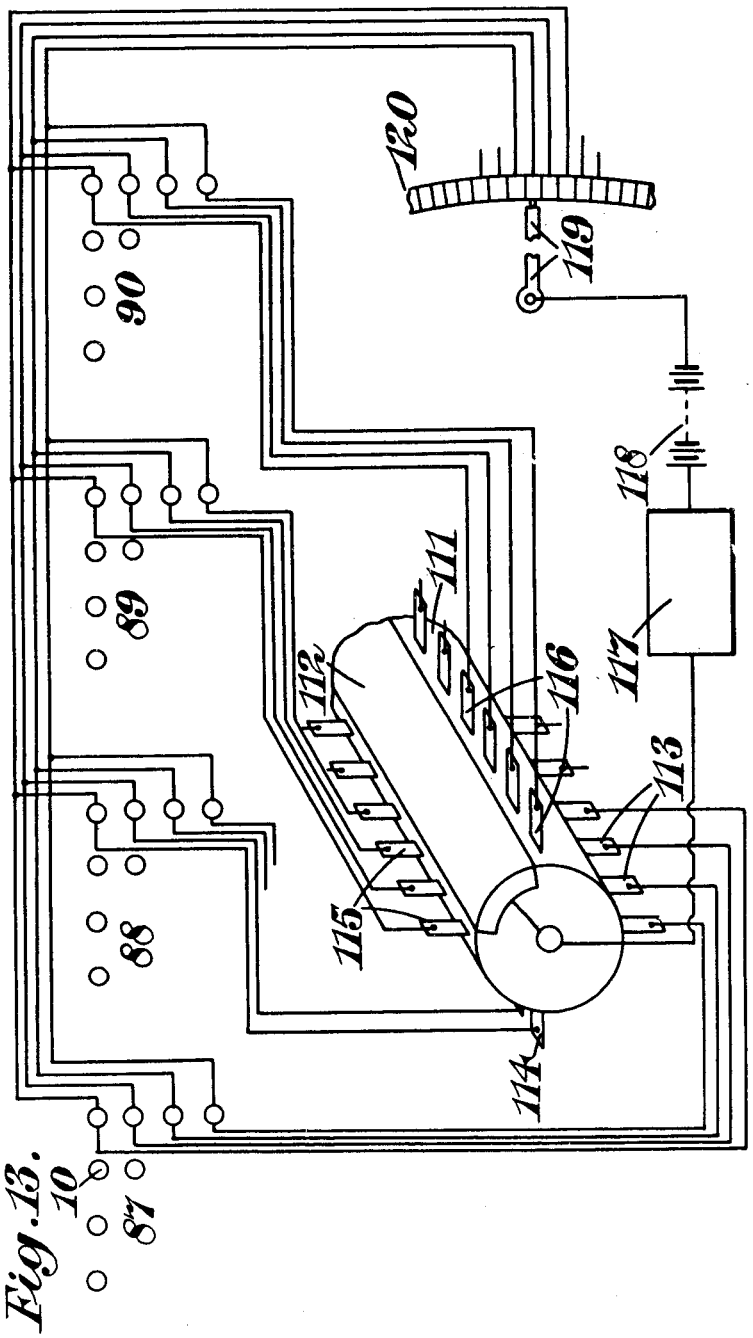
INVENTOR
John L. Baird,
By
Watson, Cont, Morse & Grindle Patented May 8, 1934

1,957,815

UNITED STATES PATENT OFFICE 1,957,815

TELEVISION APPARATUS

John Logie Baird, London, England, assignor to Baird Television Limited, London, England, a British company Application January 15, 1931, Serial No. 508,994
In Great Britain January 21, 1930

1 Claim. (Cl. 178—6)

This invention is for improvements in or relating to television or like systems and apparatus of the kind in which a receiving screen comprises a bank of lamps or a bank of shutters. Apparatus of this kind is disclosed in British patent specification Nos. 222,604 and 302,187. If lamps are employed a switching device is provided for connecting each lamp in turn to a source of electric current which is modulated in accordance with the received signals, whereby each lamp lights up in turn, to an extent corresponding to the brightness of that part of the transmitted object or scene which, at that instant, is being explored at the transmitting station. Where shutters are used each shutter is opened in turn, by an electromagnet or the like to a greater or less extent thereby admitting more or less light from a steady light source behind it. The electro-magnets are successively connected to a source of modulated current by a suitable switching device.

Exact synchronism and the correct phase relationship between the switching device at the receiving station and the exploring device at the transmitting station is maintained by any known synchronizing means, for example, such as is disclosed in United States Patent No. 1,890,558, dated Dec. 13, 1932, and patent application Ser. No. 424,061.

An object of the present invention is to improve the quality and brightness of a television image formed by an apparatus of the kind described, and to provide improved wiring circuits and an improved switching device for an apparatus of this kind. Further objects are to provide an improved construction of receiving screen and means whereby an image may be received in its natural colours.

According to this invention, television receiving apparatus of the kind described comprises, in combination with the screen, means for prolonging the time of operation of the lamps or shutters. The said means may consist of an electro-magnetic device where shutters are used or a separate battery where lamps are used.

Further, according to this invention, a television receiving apparatus of the kind described comprises, in combination with the screen, means for continuously supplying the lamps or shutter actuating devices with a part of their full operating current. Where filament lamps are employed, the continuous current keeps the filaments at a dull heat so that each lamp will immediately light up when the additional current, modulated in accordance with the received signals, is switched on to it. Where shutters are employed, each electro-magnet is already tending to open its appropriate shutter before the full energizing current is applied to it. Further, the continuous flow of current provides a delay in the extinction of the lamp or the closing of the shutter whereby the brightness and quality of the image are improved.

It will be seen that the apparatus above described embodies a large number of small resistance coils and is therefore complicated and somewhat costly to build. To remove this disadvantage in a preferred form of apparatus according to the invention, means are provided for supplying part of their full operating current to the lamps or shutter-actuating devices during a part, only, of the exploring cycle. Conveniently, the lamps or shutter-actuating devices are each connected to one segment of a commutator having a first brush for supplying the modulated current to the lamps or shutter-actuating devices and a second brush for supplying the steady current thereto. In a preferred form, the second brush comprises two portions one of which precedes and the other follows the first brush. Also, each portion is preferably of such size as to make contact with several of the commutator segments at once but the second brush is so arranged as never to make contact with the same segment as the first brush.

According to another feature of this invention, in or for a television or like system of the kind described, there is combined with the receiving screen means for diffusing the light emitted from the screen. The said means may consist of a single sheet of ground glass or a series of small sheets may be employed, one appropriated to each lamp or shutter.

Further, the lamps and/or shutters of the screen are arranged in cells for the purpose of preventing the light emitted from one lamp from reaching a part of the diffusing means appropriated to another lamp. The cells of the screen may be formed by two series of opaque partitions crossing each other at right angles. Alternatively, in order to obtain the same result, the sides of the containers or bulbs of the lamps may be coated or covered with some opaque substance, for example, the inside of each bulb may be "silvered" round the sides and back. Such a coating provides a reflecting surface at the back of the lamp, an advantage of which is hereinafter described. Instead of being "silvered", the sides of the lamps may be blackened.

The cellular arrangement of the screen is, however, preferred for the reason that the shape and size of each cell may readily be varied according to different requirements, namely, each cell will be of a square shape whereby the area illuminated by each lamp in the screen or controlled by each shutter, will be the same. However, if the method of exploration giving increased illumination, as described in British patent specification No. 322,481 be adopted, the cells may be rectangular in shape with either their longer or shorter dimension disposed in the direction of exploration, according to the degree of definition required in the received image.

Further, the cells may be of different sizes in different parts of the screen, being smaller for instance in the part of the screen where high definition is required in the image (see British patent specification No. 303,771. For this purpose, some of the cells may be square in shape, while others are rectangular. In a modification, instead of constructing the screen with some square cells and some rectangular cells, all the cells may be of the same shape but the cells in one region (or regions) of the screen may be smaller than the others, for the purpose of obtaining a greater degree of definition in that region.

According to another feature of this invention, the diffusing means referred to comprises a sheet of translucent material or a plurality of such sheets and a separate viewing screen is situated in front of the diffusing means. Such an arrangement is particularly applicable to a screen comprising a bank of shutters as herein described. The provision of the extra screen, or viewing screen, increases the diffusion of light and tends further to increase the uniformity of illumination of the received image. Although particularly suitable for use with a bank of shutters, such a viewing screen may also be used with advantage in combination with a bank of lamps.

In order to obtain a received television image in natural colours, the invention comprises a screen of the kind described in which in place of each monochromatic lamp heretofore employed, there is provided a set of differently coloured lamps. Each of such sets, in a two-colour process, will consist of two lamps, one giving the appropriate red light and the other the appropriate green light, while in a three-colour process each set will consist of three lamps, one giving blue light, another red light and a third green light. In operation, the lamps of the screen will emit light intermittently and successively, the order of succession being, say, first a blue light then a green light and finally a red light in each set, followed by a like succession from the next set and so on; or light may be emitted from all the blue lamps in the screen in succession, then light from all the green lamps in succession and finally light from all the red lamps in succession, or any desired combination of these two arrangements, the connections to the commutator device being arranged accordingly.

According to a further feature of the invention, one or all of the sheets of the screen is, or are, vibrated at audio-frequency for the purpose of reproducing the sound or music accompanying the transmitted object or screen. A rod may be fixed to the viewing screen and may pass through the centre of the shutter bank or lamp bank to the reed of a loud-speaking unit situated behind the screen.

According to another feature of this invention, a television receiving apparatus of the kind described, comprising a screen of lamps, has one or more condensers and inductive and/or resistive circuits connected in circuit with each lamp for prolonging the time of operation of the lamp. Further, a television receiving apparatus of the kind described, comprising a screen of shutters whereof each has associated with it an electromagnetic device for opening it and a spring or the like for closing it is characterized by a plurality of inductive and/or resistive circuits and condensers each connected in parallel with one of the shutter-actuating devices, for delaying the closing operation. Preferably, means are provided for short circuiting each condenser or inductive circuit after a predetermined interval of time. Such means may consist of a separate brush engaging the main commutator at a distance, preferably adjustable, in rear of the brush supplying the energizing current to the lamps or shutter-actuating devices. Where the screen is composed of shutters, in an alternative construction, each shutter has associated with it an electro-magnetic device for opening it and another for closing it and a switching device is provided for energizing each closing device at a predetermined interval of time, after the corresponding opening device.

In British patent specification No. 302,187 aforementioned, there is described an apparatus comprising a bank of lamps which are connected in rectangular-co-ordinate fashion to the segments of two commutators which are mechanically coupled together. In this apparatus, there is an alternative path, for the electric current intended for any individual lamp. Unless the lamps are of such construction that their resistance is very high until the electrical pressure across the portion is a large fraction of their full lighting pressure, this apparatus has the disadvantage that a very heavy current is consumed to light up one lamp and, moreover, lamps in the bank will glow other than the lamp which it is intended to light up. Similar observations apply to a screen of shutters whose actuating devices are connected up in the same way. To overcome these disadvantages, and in accordance with another feature of the present invention, a television receiving apparatus of the kind described comprises a plurality of groups of lamps or shutters, a switching device appertaining to each group and having each of its contacts connected to one pole of the lamp or shutter-actuating device in that group, and a selector-switch whereof each contact is connected to the same one of each switching device, the other poles of all the lamps of the shutter-actuating devices being connected to a common return conductor.

Alternatively, according to this feature of the invention, television receiving apparatus of the kind described comprises a plurality of groups of lamps or shutters, a switching device whereof each contact is connected to one pole of one lamp or the shutter-actuating device in each group and a commutator which connects all the other poles of all the lamps or the shutter-actuating devices, in each group successively to a common return conductor.

The "groups" referred to will normally be contiguous forming a single screen, the apparatus requiring but a single channel of communication between the transmitting and receiving stations for the transmission of all the image signals. However, where it is desired to produce a very large image (for example, a panoramic image), and where several channels of communication are available, each shutter a separate zone of the receiving screen, the apparatus according to this feature of the invention may comprise the combination with a switching device whereof each contact is connected to one pole of one lamp or shutter-actuating device in each zone of a plurality of coupling devices (for example thermionic valves) each connected to the other poles of all the lamps or shutter-actuating devices in one zone. By this apparatus, one lamp or shutter may be simultaneously energized in each group, but each to a different extent.

A further object of the present invention is to provide an optical arrangement whereby a normally large screen of the kind described may readily be projected upon the viewing screen without the need for an optical system of corresponding large dimensions.

The present invention accordingly comprises, in a television or like system of the kind described, a plurality of optical systems each projecting, upon a viewing screen, a portion only of the first-named screen and so arranged that the portions thus projected combine to form a complete image. Various additional advantages of such an arrangement will appear hereinafter.

To avoid inversion of each of the portions projected upon the viewing screen, each of the optical systems may include an image erecting device or, alternatively, each of the portions into which the first-named screen may be cut or divided, may be inverted with the result that the projection of such portions upon the viewing screen by the several optical systems will result in an image having its several parts in correct mutual relationship. It will be seen that the adjacent sides of the lamp screens need not necessarily be close together.

Particular forms of construction of television apparatus according to the invention will be described by way of example with reference to the accompanying diagrammatic drawings of which:

Figure 1 shows a circuit for continuously supplying all the lamps in a bank with a steady current.

Figure 2 shows a modified form of the apparatus of Figure 1 in which a few of the lamps are supplied with a steady current during part of the exploring cycle.

Figures 3 and 4 show circuits which are modifications of those of Figures 1 and 2.

Figures 6 to 11 show various forms of construction of receiving screen according to the invention.

Figures 12 to 14 show convenient circuits, according to the invention, for use with either a screen of lamps or a screen of shutters.

Figure 15 shows a construction of shutter and its actuating means.

Figures 16 and 17 show an arrangement of commutator brush holder.

Figures 18 and 19 show optical systems according to the invention, while

Figures 20 and 21 show containers for the lamps in a television receiving screen.

Figure 4:
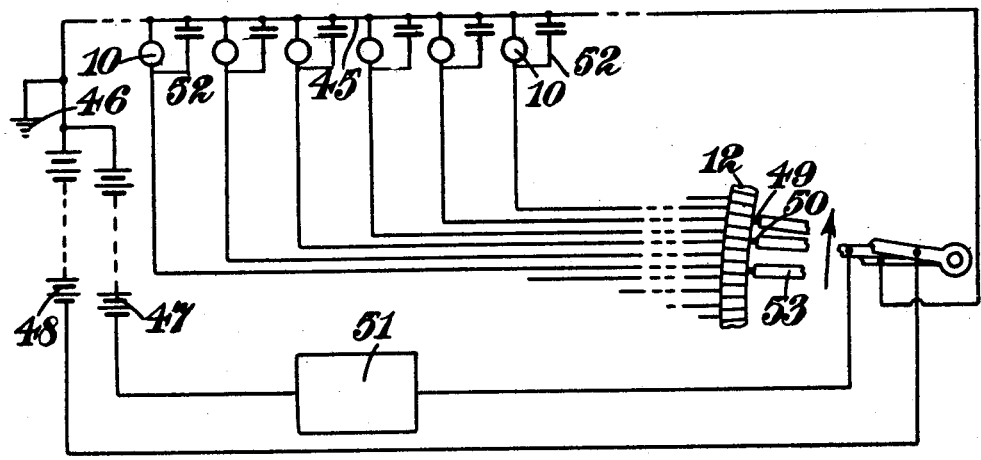

As shown in Figure 1, a television receiving screen is composed of a large number of filament lamps 10 eight only of which are shown. One pole of each lamp is connected to one segment 11 of a commutator 12. The other poles of all the lamps 10 are all connected to a conductor 18 which may be earthed as shown at 19. In some cases, where a conducting frame is used for supporting the lamps 10, the other poles of the lamps may be connected to the frame and the conductor 18 may be dispensed with.

The commutator-poles of the lamps 10 are also connected, each by a high resistance 21 to a variable inductance 9, the other end of which is connected to a battery 20, the other pole of which is connected to earth. The commutator-segments are traversed by a brush 13 carried by a rotating arm 14 which is connected to earth through a series circuit comprising a resistance 8 and an inductance 15. The arm 14 is also connected to one output terminal of a source 16 of modulated current; the other output terminal is earthed.

The apparatus shown in Figure 1 operates as follows. The battery 20 supplies all the lamps 10, by way of the inductance coil 9 and the resistances 21 with a steady current which heats the filaments to a point bordering upon visibility. As the brush 13 sweeps over the segments 11 of the commutator 12, each lamp 10 is lighted, to a greater or less degree, by modulated current from the source 16.

If the circuit of any one of the lamps should become broken (for example, if the filament should burn out) severe electrical oscillations are set up in the apparatus when the brush 13 reaches the segment 11 to which that lamp is connected, with the result that the next lamp to be switched on may be damaged or burnt out. The circuit 8, 15 obviates this by providing an alternative path for the current from the source 16. In a modification, the inductance may be tuned to an optimum frequency. A variable impedance 9 which may be inductive or resistive is used to vary the biassing current to the lamps.

Figure 2 shows a number of lamps 10 and a commutator 12 the segments 11 of which are each connected, as before, to one pole of one of the lamps 10. The other poles of all the lamps 10 are together connected by a conductor 23 to a smaller battery 24 and a larger battery 25. The conductor 23, as before, may be constituted by the supporting frame of the screen as shown at 26. The other pole of the smaller battery 24 is connected to a series of brushes 27 all carried in a holder 28. The other side of the larger battery 25 is connected, by way of a modulating device 29 to a single brush 30 situated between two groups of the brushes 27 and carried on an arm 31. The arm 31 and the holder 28 are bolted together by insulating strips 32.

The apparatus shown in Figure 2 operates as follows:—

As the brushes 27 and 30 sweep over the commutator 12, each lamp will be energized by the electric battery 24, then by the battery 25 and finally by the battery 24 again. The battery 24 is of such size as to heat the filaments of a lamp without causing it to glow whereas the battery 25, in conjunction with the modulating device 29 causes each lamp to glow to the required extent. The effect of the battery 24 is to heat up the filaments of the lamps just before they are to be lighted up and to energize them again for a short time after the modulated current has been passed through them. This apparatus gives an image of improved brightness and smoothness.

Figure 3 shows a circuit for a screen of lamps 10 in which a part of the steady energizing current is supplied to the lamps through the brush which supplies the modulated current. A commutator 12 has its segments 11 connected to the lamps 10 as in Figures 1 and 2. The single brush 33 is carried on a rotating arm 34 which is connected to a battery 35 by a circuit consisting of a modulating device 36 and a variable resistance 37 in parallel. At right angles to the arm 34 is a double arm 38 carrying a few brushes 43 at each end and connected to another battery. The other ends of the batteries 35 and 39 are connected together with a common return wire 40 from the lamps 10 and may be earthed as at 41. A high resistance 42 is connected from the arm 34 to the conductor 40.

This apparatus operates as follows:—

A steady current from the battery 39 is switched on to a few of the lamps during part of the exploring cycle by the brushes 43. This steady current heats the filaments of the lamps in readiness for the modulated current from the brush 33 and delays the extinction of each lamp. The modulated current for the lamps is switched on to them by the brush 33 from the battery 35, but in addition to the modulated current, a certain steady current is carried by the brush 33 the value of which may be adjusted by controlling the variable resistance 37. In this circuit, the stability is improved by the resistance 42 which provides a path for the current in case one of the lamps should burn out.

In Figure 4, a series of lamps 10 is connected to a commutator 12 as before and a common return wire 45 from the lamps is earthed at 46 and is connected to two batteries 47 and 48. The battery 48 supplies a steady current to the lamps by a brush 49, the battery 47 provides the modulated current through a brush 50 and a modulating device 51, and in parallel with each lamp 10 there is a condenser 52.

The brush 49 precedes the brush 50 so as to energize each lamp with a steady current just before the brush 50 supplies it with the modulated current. A third brush 53 which may be fixed to the brushes 49 and 50 and rotates therewith follows the brush 50 and is connected to the conductor 45.

As the brushes 49, 50 and 53 rotate, each lamp 10 is energized with steady current by the brush 49, and, at the same time, the corresponding condenser 52 is charged. The brush 50 will then supply the modulated current from the battery 47 to the lamp and charges the condenser 52 still more. When the brush 50 has passed from the segment of a particular lamp, the condenser 52 associated with that lamp discharges through the lamp and keeps it glowing until the brush 53 arrives at that segment and short-circuits the condenser.

The angular distance between the brushes 50 and 53 is adjustable, whereby the period of time during which each lamp 10 will glow, may be set or varied. A resistance may be inserted between each lamp and the conductor 45, whereby the period of discharge of each condenser 52 may be increased.

Figure 5:
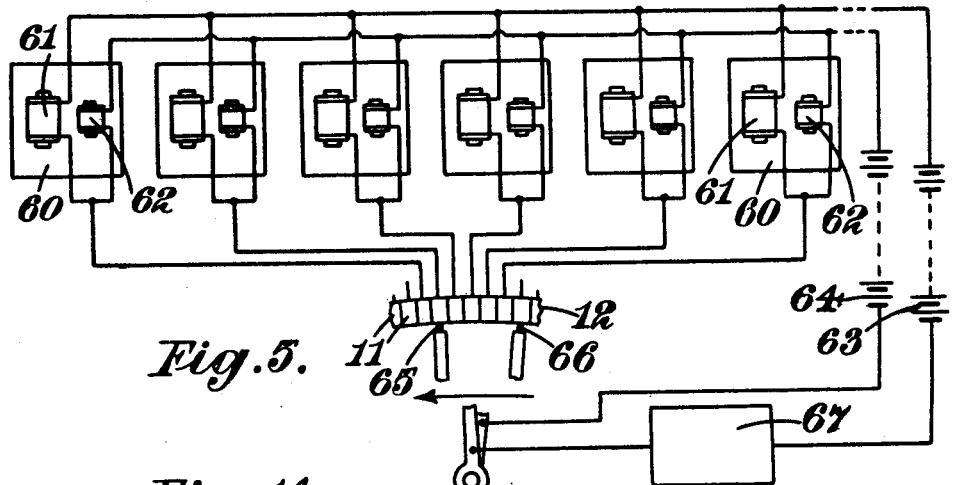
Figure 5 shows a circuit whereby a commutator may be used to open and close each shutter in a screen of shutters.

In all the apparatus described above, instead of using lamps 10, shutter-actuating devices may be used in the same way. A further convenient arrangement of television receiving apparatus in which shutters are employed is shown in Figure 5. A receiving screen is composed of a large number of shutters 60, six only of which are shown. Each shutter has associated with it two electro-magnets; a large magnet 61, for opening the shutter and a smaller magnet 62, for closing it. One pole of each of the two magnets 61 and 62 associated with one shutter are together connected to a segment 11 of a commutator 12, while the other poles of all the large magnets 61 are connected to a battery 63 and all the other poles of the smaller magnets 62 are connected to a battery 64. The other pole of the battery 63 is connected to a brush 65, while the other pole of the battery 64 is connected to a battery 66. This apparatus operates as follows:— The two brushes 65 and 66 rotate together in the direction of the arrow, and the brush 65 opens each shutter in turn by switching on the battery 63 to each coil successively. After a given time, the brush 66 arrives at the same segment and connects the battery 64 to the electro-magnet 62, whereby the shutter is closed. The angular distance between the brushes 65 and 66 is adjustable, whereby the period during which each shutter is open may be set. A modulating device 67, included in the circuit of the battery 63, controls the extent to which each shutter is opened.

Various constructions of receiving screen, according to the invention, will now be described.

As shown in Figure 6, a series of lamps 10 are arranged in cells formed in a screen 70 by a series of opaque partitions 71, 72'. The light from each lamp 10 is confined to its own cell by the partitions 71 and 72. Covering the whole of the face of the screen is a sheet of ground glass 73 which fits closely against the open ends of the lamp cells. As each lamp is lighted up, that part of the glass sheet 73 covering the cell of that lamp, is illuminated according to the quantity of current flowing through that lamp. The purpose of using ground glass instead of a transparent medium is to diffuse the light from each lamp over a small area and thus to give each square an even intensity of illumination over its area.

Figure 7 shows a series of lamps 10 arranged in rectangular cells 74. The sheet 73 is not shown in this figure. As shown, the cells 74 are rectangular with their larger dimensions vertical but the screen could be constructed so that the cells have their larger dimensions horizontal. It is possible, by the use of a screen constructed in this way, to employ the method of exploration giving increased illumination described in British patent specn. No. 222,604.

Figure 8 shows an arrangement of square cells 75 constituting the margins of the screen and a series of rectangular cells 76 arranged between the two margins of cells 75. It is possible, with a screen constructed in this way, to employ a system of graduated exploration such as is described in British patent specn. No. 303,771. The cells 76 are arranged in vertical rows which correspond to narrow bands of exploration at the transmitting station. Instead of using only two sizes of cells, cells of an intermediate size could be interposed on either side of the cells 76 and any number of intermediate increases in size could be made. It will be seen that this kind of screen has a vertical band of fine definition extending for its whole height.

Where it is desired to confine the increased degree of definition to a central portion of the screen, a screen such as is shown in Figure 9 may be used. Here, the cells 77 forming the border of the screen 70 are large squares, whereas the cells 78 at the centre of the screen may be also of square shape but are much smaller than the cells 77.

Figure 10 shows a screen 79 comprising a large number of rectangular shutters 80 which may be electromagnetically opened in succession, as hereinbefore described. Behind each shutter there is a lamp, and each shutter and its lamp are contained in a separate cell; the cells are formed by partitions 81, 82 which run at right angles over the entire length and breadth of the screen. Situated in front of the screen 79 is a sheet 83 of ground glass which corresponds to the sheet 70 of Figure 6 and serves to diffuse the light emitted from each cell. It will be appreciated that the beam or beams of light emitted from the shutters 80 will be of very irregular cross-section, that is to say, the distribution of illumination over the area of the sheet 83 corresponding to one of the cells of the screen 79, will be very uneven. It is therefore desirable to provide a second sheet 84 of ground glass to diffuse the light from each cell still more. The sheet 84 tends to increase the uniformity of the illumination of the received image and obliterate sharp lines in the image, which may be formed by the edges of the shutters 80. The sheet 84 may constitute the viewing screen or a projecting apparatus may be provided, as is hereinafter described.

The apparatus of Figure 10 has been shown as applied to a screen of shutters but, it will be understood, the provision of the second sheet 84 may, in some cases, be found advisable in conjunction with a screen of lamps. Also, it will be understood that the sheets 83 and 84 are described as of ground glass, by way of example only, and that any other suitable material, such as translucent celluloid, could be used.

In Figure 11, the screen 79 of shutters is shown in vertical section and the sheet 83 of ground glass is connected to the screen 79 at its upper and lower edges. Attached to a central point in the sheet 83 is the end of a rod 85 which passes through the screen 79 and the other end of which is connected to the armature of a loud-speaking telephone unit 86. This apparatus may be used to reproduce the sound or music corresponding to the image which is produced on the screen and one advantage of the construction above described is that the sound is reproduced in exactly the same plane as the image, whereby a realistic effect is obtained.

Where it is required to transmit a television image in separate zones and where a plurality of channels of communication are not available an apparatus as illustrated in Figure 12 may be employed. A bank of lamps is shown as comprising four groups 87, 88, 89, 90. Only a few of the lamps 10, in each group, are shown, in order to simplify the drawings. One pole of each of the lamps 10 in the group 87 is connected to a separate segment 91 of a commutator 92 while the lamps in the groups 88, 89 and 90 are similarly connected respectively to commutators 93, 94 and 95. The single brush 96 co-operating with the commutator 92 is connected to one segment 100 of a selector switch 110. The switch 110 has four such segments and the brushes 97, 98 and 99 of the remaining commutators 93, 94 and 95 are respectively connected to the segments 101, 102 and 103.

The selector switch 110 has two brushes, a narrow brush 104 which is connected through a modulating device 105 to a battery 106 and a broad brush 107 which is connected to a separate battery 108. The other poles of the batteries 106 and 108 are together connected by a return conductor 109 to the other poles of all the lamps 10 in the bank.

This apparatus operates as follows:—The brushes 96, 97, 98 and 99 are all rotated together at high speeds while the brushes 104 and 107 of the selector switch 110 are rotated at exactly a quarter of this angular speed. As the brush 104 rotates, it connects each brush 96, 97, etc. successively to the modulating device 105. Also, as the brush 107 rotates it connects each of the brushes 96, etc., to the battery 108 in turn. Thus, since the brushes 96, 97 etc., are making contact with each lamp in turn in the groups 87, etc., it will be seen that all the lamps in the bank will light up in turn to an extent controlled by the modulating device 105. The battery 108, by way of the brush 107 causes a steady current to flow through the lamps during part of the exploring cycle whereby the lamps will light up more readily when they are switched on to the modulating device 105.

Figure 13 shows an arrangement alternative to that of Figure 12. The lamps 10 as before, are arranged in groups 87, 88, 89 and 90. A particular form of commutator 111 has a single conducting segment 112 which occupies nearly a quarter of the whole commutator surface. In engagement with the commutator 111 are four sets of brushes 113, 114, 115 and 116. Each of the brushes 113, is connected to one pole of one lamp of the group 87; the sets of brushes 114, 115 and 116 are similarly connected to the lamps 10 in the groups 88, 89 and 90 respectively. The segment 112 of the commutator 111 is connected by a slip ring (not shown) to a modulating device 117 to which is connected a battery 118. The other pole of the battery is connected to the arm 119 of a commutator 120 having as many segments as there are lamps in any one of the groups 87, etc. Each segment of the commutator 120 is connected to the other pole of one lamp in each of the four groups 87, etc.

The arm 119 is driven at high speed and the commutator 112 rotates at exactly a quarter of this speed. It will be seen that the commutator 112 connects the lamps in each group successively to the modulating device 117 whereas the commutator 120 connects the other poles of those lamps to the other side of the battery 118. This circuit offers no alternative path to the electric current intended for any individual lamp.

Figure 14:
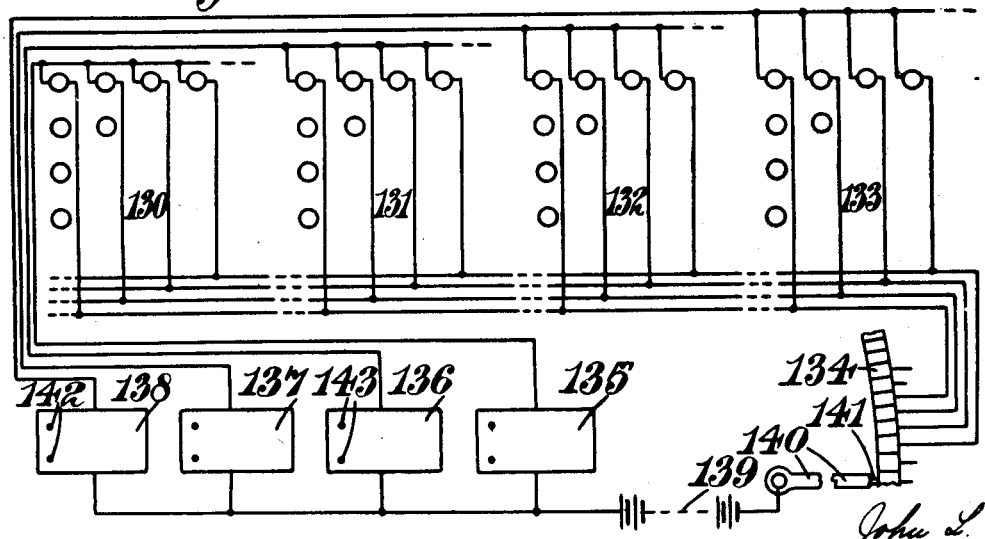

As shown in Figure 14 a screen of lamps is divided into a plurality of zones 130, etc., four of which are shown; a commutator 134 has each of its segments connected to a conductor which feeds one lamp in each zone. The other poles of all the lamps in the zone 130 are connected to a modulating device 135 and the other zones 131, 132 and 133 are similarly connected to modulating devices 136, 137 and 138 respectively. The other output terminals of the modulating devices are connected in common to a battery 139, the other pole of which is connected to an arm 140 carrying a brush 141 which sweeps over the segments of the commutator 134. Output terminals 142 of the modulating device 138 are connected in known manner to a wireless receiving apparatus or to a cable. The terminals 143 of the modulating device 136 are similarly connected to a wireless receiving apparatus tuned to a different wave length or to a separate cable. The other modulating devices 135 and 137 are also similarly connected to separate channels of communication.

At the transmitting station of a television system employing apparatus of the kind shown in Figure 14 at the receiving station, means are provided for transmitting the image in separate zones. The zones may be contiguous or not, and if they are not it is equivalent to the transmission of a plurality of distinct images. The advantage of this apparatus is that a single commutator may be used to supply the lamps in all the zones, and the principal use of such apparatus occurs where there is no objection to the use of more than one channel of communication.

The apparatus described with reference to Figures 6, 7, 8, 9 and 12, 13 and 14 may be used with equal success where shutters are employed instead of lamps. Moreover, these circuits may be combined with the apparatus described with reference to Figures 1 to 3 and 4 if desired. Further, the protective condensers, resistances and inductances may be employed in any or all of the circuits described.

As shown now in Figure 15, a shutter for use in a television apparatus according to this invention, comprises a rectangular sheet 150 of metal mounted on a central spindle 151. The spindle is carried in suitable bearings (not shown). Keyed to the spindle 151 is an armature 152 having a cylindrical outer surface to co-operate with the pole 153 of an electro-magnet 154. The pole 153 is also provided with a cylindrical surface so that on the rotation of the spindle 151 and the armature 152, the two cylindrical surfaces move very close together but without touching. A helical spring 155 is coiled about the spindle 151 and is affixed at 156 to some fixed part of the supporting frame (not shown).

When electric current is switched on to the coil of the electro-magnet 154, the armature 152, and therefore the spindle 151 and the shutter 150, is rotated to a degree which depends upon the strength of the current in the coil. The spring 155 opposes the rotation of the shutter and closes the shutter when the electric current is switched off from the magnet 154.

Instead of using the spring 155, a separate electro-magnet, also co-operating with the armature 152, may be used for closing the shutter. Further, to damp the movement of the shutter, the plate 150 may be surrounded by a coil of wire through which the current is kept flowing, thereby providing a magnetic field through and around the shutter. Alternatively, a dash-pot mechanism can be used.

Figure 16 is a perspective view of a brush which is suitable for use in apparatus of the present invention.

Figure 17 shows the brush and holder in section. The brush proper is a strip of metal 160 mounted on a plunger 161 which bears on a compression spring 162, the stress of which may be adjusted by means of a milled screw 163. The casing 164 may be attached to a rotating arm by bolts inserted in holes 165.

In order to remove the disadvantage of a screen of the kind described, namely the uneven distribution of illumination over each individual area, the apparatus shown in Figure 18 may be employed in which the image of a large screen of shutters 166 is projected by means of an optical projecting system 167 on to a smaller screen 168, on which the image may be viewed. The optical system 167 may be surrounded by an opaque screen 169 in order to prevent light from reaching the screen 168 from the screen 166 except through the optical system 167. By this apparatus, any unevenness in illumination over each individual area of the screen 166 is considerably reduced on the screen 168. Further, it is possible, by adjusting the components of the optical system 167, to throw each individual area slightly out of focus on the screen 168, while still maintaining the correct disposition of these areas as a whole. Further, with a screen of the kind described, it is possible to introduce optical projecting systems and still to obtain a bright final image, since the lamps employed in the screen, whether shutters are used or not, may be chosen and so supplied with electric current as to give a very bright initial image. Instead of reducing the size of the image from the screen 166 to the screen 168, the screen 168 may be made much larger than the screen 166 and the optical system 167 so adjusted as to magnify the image. If the optical system 167 is such as to invert the image, the lamps or shutter-actuating devices of the screen 166 may be either connected up upside down, i. e. so that the image formed on the screen 166 is inverted, or else an optical erecting system may be placed in front of the optical system 167.

In the apparatus shown in Figure 19, three separate images or three separate parts of the same image are received on screens, of the kind described, 170, 171 and 172. These screens may be spaced apart, as shown and, in the case where the image formed on each is one-third of a complete image, may be either inverted or the right way up. A smaller screen 173 is arranged in front of the screens 170, 171, 172, and three optical projecting systems 174, 175 and 176 are so arranged and mutually inclined as to project reduced contiguous images 177, 178, 179 from the screens 170, 171, 172 on to the screen 173. If one complete image is being received, the optical projecting systems 174, 175 and 176 will be so adjusted as to project each image 177 etc., the right way up and in its correct position with respect to its companions. An opaque screen 180, through which the projecting systems 174 etc., may be fitted, is placed between the screens 170 etc., and the screen 173 to prevent light from reaching any section of the screen 173 except from the appropriate screens 170, etc.

The cells for the various lamp-screens described above may be formed as shown in Figure 21 which shows a container 181 in the form of a cylinder surrounding the lamp 10. The back of the cylinder 181 is formed as a concave mirror 182 and the mouth of the cylinder is closed by a convex lens 183. The covered walls of the cylinder 181 prevent the light from the lamp 10 from being dispersed and from reaching a part of the diffusing means appropriated to some other lamp. The reflector 182 and the lens 183 concentrate the light on the diffusing means and it will be seen that, with this construction of container for each lamp, it is not essential to use the partitions 71 and 72 of Figure 6.

For producing a received television image in its natural colours, apparatus of the kind shown in Figure 21 may be employed which is a front view of a cylindrical cell 190 which contains three lamps 191, 192, 193. Each of the lamps 191 etc. is conveniently chosen to emit light of a suitable colour and suitable intensity to give the combined effect of a three-colour process. The receiving screen will comprise a large number of cells 190.

At the transmitting station, any usual type of apparatus for the transmission of images in colour may be employed. The object an image of which is to be transmitted, is explored by three differently coloured beams of light, each of the appropriate colour and intensity and each corresponding to one of the lamps in each cell of the receiving screen. Each light-sensitive cell at the transmitting station is covered with a coloured filter of the appropriate colour which cell may be so constructed as to be most sensitive to a particular colour.

I claim:—

Apparatus for the reconstitution of television images comprising a screen composed of a plurality of non-unilateral light controlling elements, a commutator for distributing modulated current to each of the said elements in ordered sequence, a source of modulated current, a source of biasing current, a plurality of capacitative impedances each of which is connected in parallel with one of the light controlling elements, a brush coacting with said commutator to distribute biasing current to the light controlling elements, a brush carrying the modulated current following said first named brush, and a brush for short circuiting each of the parallel capacitative impedances at a predetermined time after the modulated current has been supplied to the elements of the screen.

JOHN LOGIE BAIRD.